Figures 1, 2:
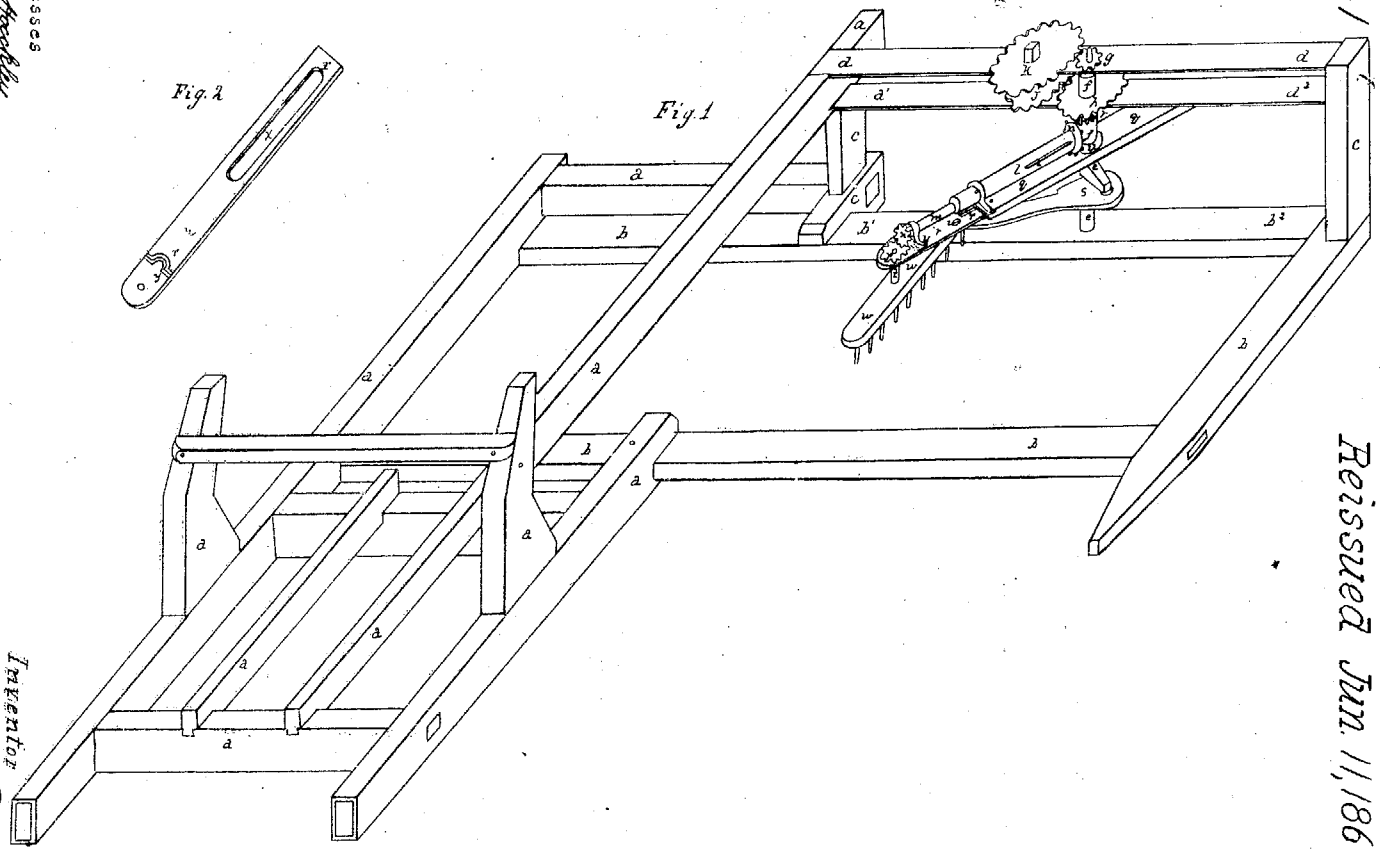

T. N. Lupton.

Harvester Rake.

No. 2641 Reissued Jun. 11, 1867.

Witnesses
Henry F. Hockley
Geo. E. Buckley

Inventor
Adam R. Reese
by his atty
Geo. Bundy

UNITED STATES PATENT OFFICE.

ADAM R. REESE, OF PHILLIPSBURG, NEW JERSEY, ASSIGNEE OF THOMAS N. LUPTON.

IMPROVEMENT IN RAKES FOR REAPING-MACHINES.

Specification forming part of Letters Patent No. 13,596, dated September 25, 1855; reissue No. 2,641, date June 11, 1867.

*To all whom it may concern:*

Be it known that THOMAS N. LUPTON, of Winchester, in the county of Frederick and State of Virginia, did invent certain new and useful Improvements in Automatic Rakes for Harvesting and Reaping Machines; and that the following is a full, clear, and exact description of the same, reference being had to the accompanying drawings, making a part of this specification, in which—

Figure 1 shows a platform or framing, *a b c*, to which are attached the automatic devices, composed of a vertical crank, *e e*, with tubular collar *f f*, spur-wheels and drivers, and bevel-gearing *g*, *h*, *i*, *j*, *k*, *n*, *m*, and *p*, and a revolving sleeve, L, and revolving piston-rod *m*; the slide-socket *q q* and reciprocating arm *r r*; the pitman *u*; crank-connecting rod *s s*; the horizontal rake *w w*. Fig. 2, slotted sliding arm *r r*.

The improvement consists in arranging an automatic discharging-rake, in a harvester, with a straight finger-beam, so that the rake shall pursue a path parallel, or nearly so, to the finger-beam, and to the inner and outer side of the platform, entering on the side next to the standing grain, following it to the front, thence across the platform parallel, or nearly so, to the finger-beam, and then along the side opposite to the first, discharging the grain, and, finally, along the rear of the platform to the place of starting.

To enable others skilled in the art to construct this rake, the invention is described as follows:

A crank, *e e*, is formed of desired diameter and length, and arranged to, and supported vertically by, cross-pieces $b^1$ $b^2$ *d*. The upper part of this vertical crank works through a collar, *f f*. The upper part of this collar *f f* is attached to a gear-wheel, *h*, working above the cross-piece $d^1$ $d^2$. At the upper extremity of the crank-shaft is a small spur-wheel, *g*, working in a driving-gear, *k*, having its axle-shaft extending through the cross-pieces *d d* downward to the lower cross-pieces $d^1$ $d^2$, and at the lower end of this axle or shaft is attached a small gear, *j*, working in another of the same diameter, as seen at *h*. Underneath the cross-piece $d^1$ $d^2$, and attached thereto, is a small inverted bevel-wheel, I′. The collar *f f* is attached permanently to a base-plate or bevel-washer, *v*, corresponding to the bevel of the fixed-gear I. This collar and base-work around the crank-shaft, and are attached permanently to a horizontally-working slide-socket, *q q*, of suitable size and length. This slide-socket is formed of a strip of thin plate or sheet metal, with turned or flanged edges, thus forming a groove or slide-plate, within which is fitted a reciprocating or sliding arm, *r r*, having an oblong opening or slot, *x*, Fig. 2, formed in it, sufficiently wide to admit the crank-shaft or spindle to pass through it, as well as long enough to afford the desired play backward and forward. To the slide-socket *q q*, at its forward end, is attached a little collar-standard, *o o*, which holds or supports a sleeve or tubular socket, L, having a small slot, *x*, formed longitudinally, and large enough for a small screw or pin to work or slide in. To the back end of the sleeve-socket is attached a small bevel-gear wheel, *n′*, with a pivot or small journal end working in a collar, *f f*. Within the slotted revolving sleeve or tubular socket L works a revolving piston-rod, *m*, having on its out end a small bevel-gear wheel, *n*. This revolving piston-rod is supported by a collar-standard, *y*, attached to supported by a collar-standard, *y*, attached to the reciprocating arm *r r*, to the under side of which arm is attached a crank-rod or pitman, *s s*. This pitman is attached to the arm by a screw or rivet joint, *z*. At the end of the reciprocating arm *r r*, and working pendently therefrom, is a small rod or shaft, *t*, passing upward sufficiently through the arm *r r* to admit of having a small bevel-cog wheel, *p*, attached to its end, and of the same size as the bevel-gear *n*. To the lower extremity of this pendent rod or shaft *t* is attached permanently a horizontal rake, *w w*. The whole of the within-described devices being shown complete in Fig. 1.

In forming this improved automatic rake, which can be most readily attached to, or connected with, the framing or platform of an ordinary reaping or harvesting machine without requiring any very material alteration of the general mechanical construction of the original machine, the operation of the said rake is as follows: Motion is communicated to the gear-wheel *k* by any band and pulley arrangement or gear-work connected with the general mechanism of the machine; and the gear-wheel *k*, working in the spur-wheel *g*, attached to the crank *e e*, gives motion to the said crank *e e*, while the spur *j*, being attached to the same common axle of the gear-wheel *k*, works in the other spur-wheel *h*, attached to the collar *f f*, which collar extends downward, and is attached to the slide-socket *q q* by the base-washer *v*. It will be observed that the crank revolves independently of the wheel *h*, which moves the slide-socket; thus, the crank rotates, and the slide-socket revolves around the crank. This crank is connected with the slide-socket through means of the pitman or connecting-rod *s s*, connected to the reciprocating arm *r r* by a pivot or screw-joint, *z*. As the crank rotates, the slide-socket *q q* is carried around, and in this movement the revolving sleeve-socket L is also carried around, and at the same time is revolved by the bevel-gear *n'*, working in the stationary or fixed bevel-gear *i'*. The revolving piston-rod *m*, as it moves around with the sliding arm *r r*, also plays in and out, and as its end bevel-gear *n* actuates the bevel-gear *p*, attached to the rod *t*, the rake *w w* is caused to maintain a parallel position relative to the sides of the machine and the grain-platform; and while the slide-socket *q q* describes a true circle, the slotted sliding arm *r r* and the revolving reciprocating piston-rod *m* both play in and out simultaneously, having a compound motion, and while rotating on their axis revolve or move horizontally, and describe a serpentine circuit, by which arrangement the rake *w w* is made to pursue a path parallel, or nearly so, to the finger-beam, and to the inner and outer side of the platform, entering on the side next to the standing grain, following it to the front, thence across the platform parallel, or nearly so, to the finger-beam, and then along the inner side of the platform, discharging the grain, if desired, in bundles at the side of the machine, or on a receiving-platform, if desired.

The foregoing is a full and accurate description of the construction and operation of said automatic rake; and, being well aware that cranks, pitmen, rods, and gear devices have been employed as elements in part of the mechanical construction of grain-harvesting machines, it is wished to be understood that such devices are not claimed separately in this application; but

What is claimed as new and original, and desired to secure by Letters Patent, is—

1. Arranging the automatic rake so as to pursue a path parallel, or nearly so, to the side of the platform next to the standing grain, thence across the platform parallel, or nearly so, to the front, and thence toward the rear of the platform, and then returning to the place of beginning, continuously.

2. An automatic rake, in combination with an elongated arm or shaft for carrying or driving it.

3. An automatic continuously-rotating rake on a vertical axis mounted on the platform, in combination with a straight finger-beam.

4. Attaching the rake-head to an extensible arm in such manner as to allow the rake-head to follow the contour of the platform in its rotation.

ADAM R. REESE.

Witnesses:
JOHN WHITE,
GEO. E. BUCKLEY.